United States Patent
Christofersen

(12) 
(10) Patent No.: US 6,459,559 B1
(45) Date of Patent: Oct. 1, 2002

(54) THYRISTOR CONTROLLED DYNAMIC VOLTAGE SUPPRESSOR FOR ELECTRIC POWER SYSTEMS

(76) Inventor: Dale Jack Christofersen, 2830 Urbandale La., Plymouth, MN (US) 55447

( * ) Notice: Subject to any disclaimer, the term of this patent is extended or adjusted under 35 U.S.C. 154(b) by 0 days.

(21) Appl. No.: 09/484,401

(22) Filed: Jan. 14, 2000

Related U.S. Application Data

(60) Provisional application No. 60/115,910, filed on Jan. 14, 1999.

(51) Int. Cl.$^7$ ................................................ H02H 1/00
(52) U.S. Cl. ....................................................... 361/124
(58) Field of Search ................................. 361/111, 115, 361/118, 124, 91

(56) References Cited

U.S. PATENT DOCUMENTS

| | | | |
|---|---|---|---|
| 4,470,005 A | 9/1984 | Gyugyi | |
| 4,571,535 A | 2/1986 | Gyugyi | |
| 4,888,661 A | * 12/1989 | Belbel et al. | ................ 361/102 |
| 5,621,599 A | 4/1997 | Larsen et al. | |
| 6,226,166 B1 | 5/2001 | Gumley et al. | |

OTHER PUBLICATIONS

Hingorani et al; Understanding FACTS: concepts and technology of flexible AC transmission systems; 2000; pp 24–26; IEEE Press Marketing, Piscataway, NJ 08855–1331.

* cited by examiner

Primary Examiner—Edward H. Tso
(74) Attorney, Agent, or Firm—Moore & Hansen

(57) ABSTRACT

Power system overvoltage protection is primarily accomplished by the application of Metal Oxide Varistors (MOVs). MOV voltage limiting capability may be enhanced by the application of power electronics. For instance, capacitor voltage suppression may be accomplished using a DVS system during switching to reduce inrush transient overvoltages or to remove trapped charges. This is achieved by dynamically changing the arrester characteristics. The DVS approach involves integrating an MOV block with antiparallel thyristor pairs. A single DVS unit may be used to reduce inrush transient overvoltages when energizing. When de-energizing, the trapped charge is suppressed by sequentially bypassing several units. EMTP-based simulations demonstrate the overvoltage reduction may be reasonably accomplished. Potential benefits include improvement in power quality, life extension of equipment by reducing reactive switching overvoltages, use of conventional switchgear and a relatively fast switching response for reactive power control.

2 Claims, 5 Drawing Sheets

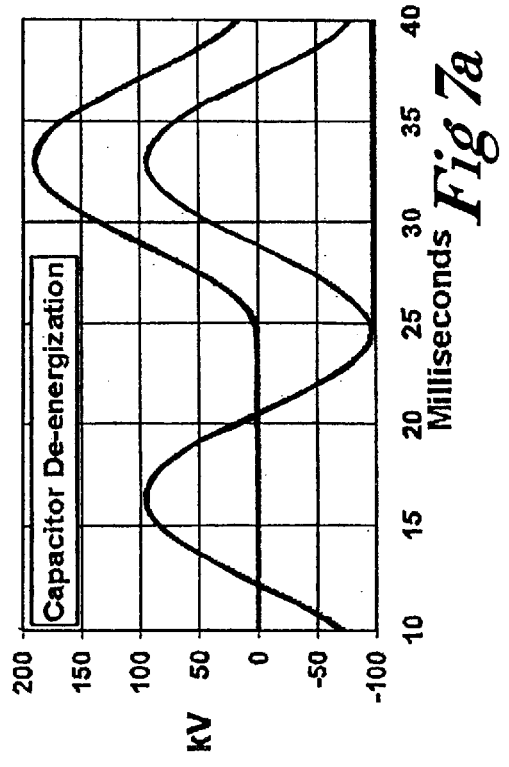
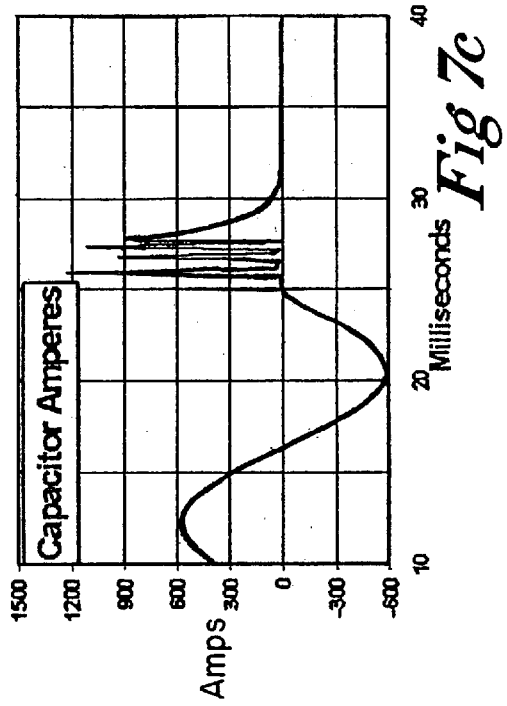
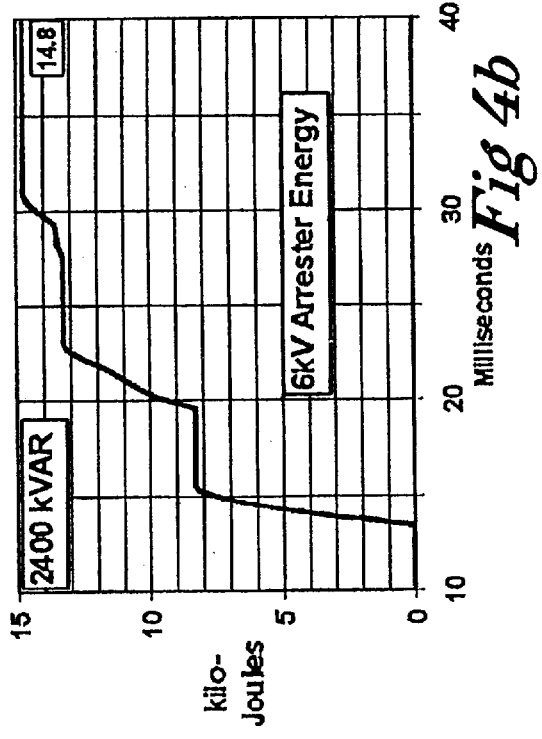
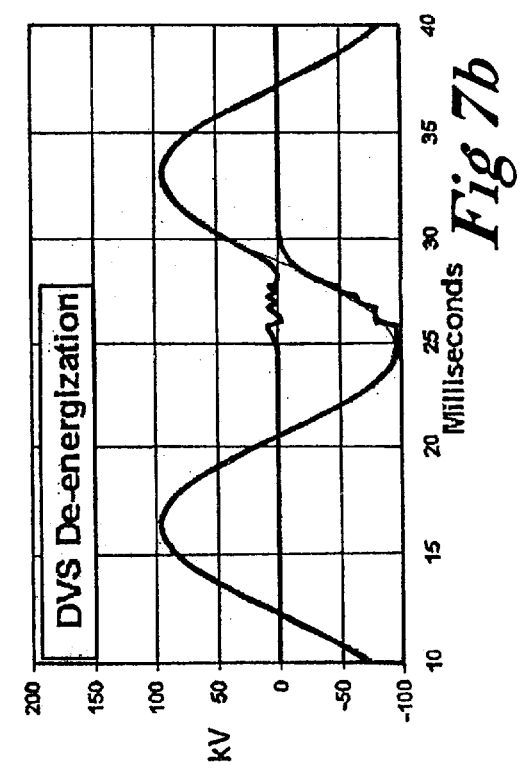

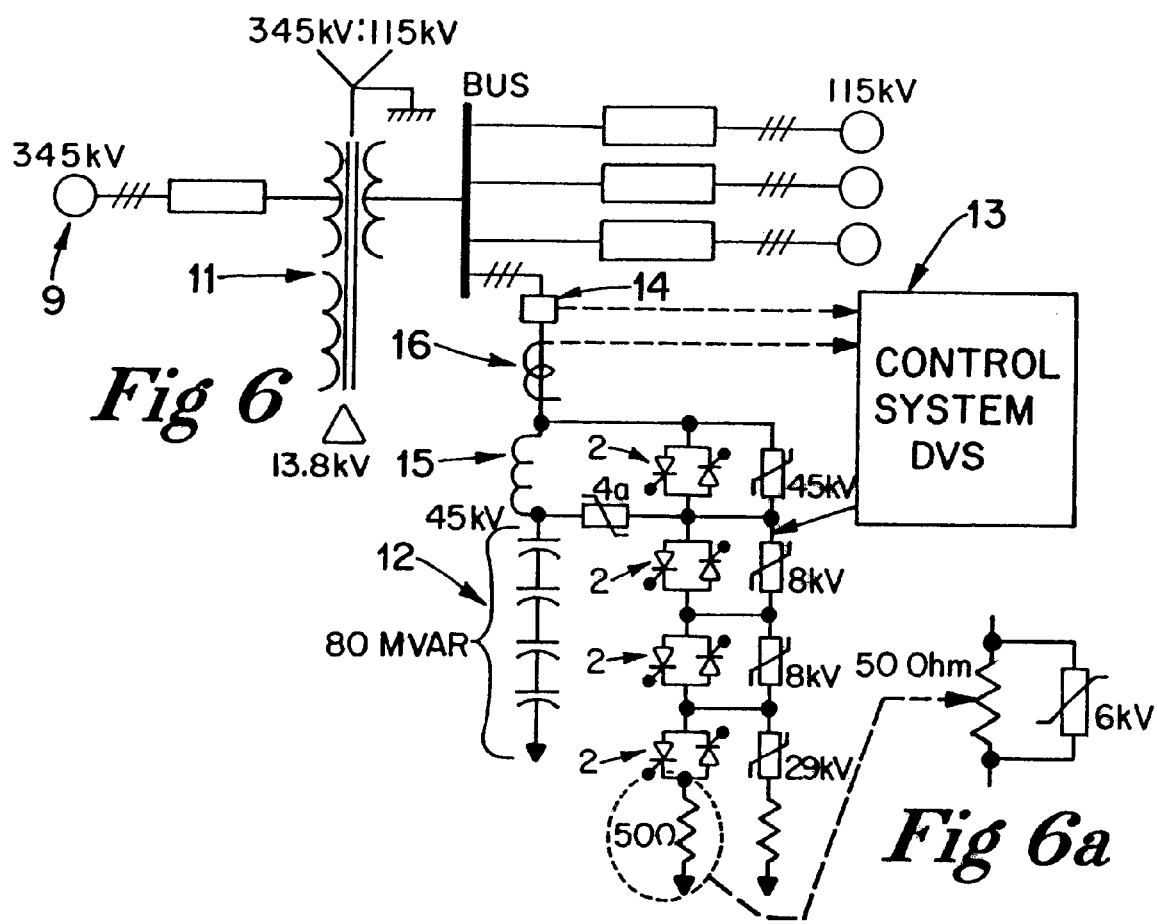
*Fig 6*
*Fig 6a*
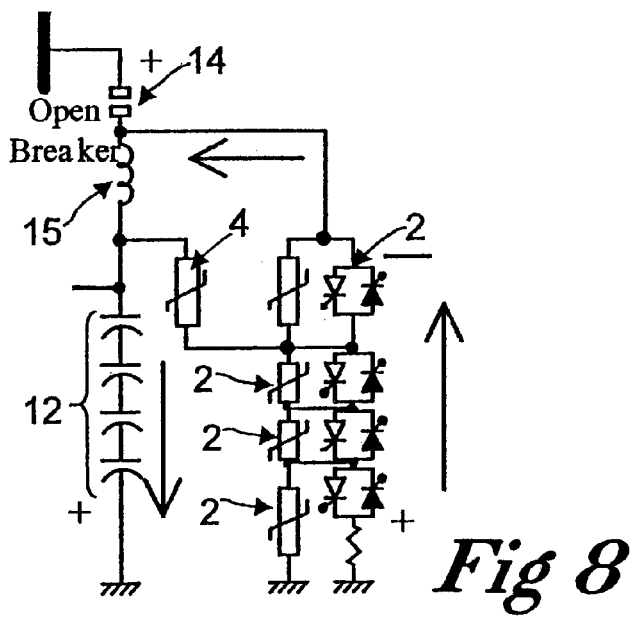
*Fig 8*

THYRISTOR CONTROLLED DYNAMIC VOLTAGE SUPPRESSOR FOR ELECTRIC POWER SYSTEMS

This application is based on and claims priority benefit of copending provisional application Ser. No. 60/115,910 filed Jan. 14, 1999.

BACKGROUND OF INVENTION

This invention relates to electric power systems, and particularly to power system overvoltage protection. The need arises to suppress power surges which occur when utilities switch reactive components such as capacitor banks.

Metal Oxide Varistors (MOVs) have been applied to limit overvoltages resulting from such power surges caused when switching capacitor bank locations. Significant improvements can be achieved by applying power electronics to MOVs to develop a Dynamic Voltage Suppressor (DVS) scheme. The DVS improvements include inrush overvoltage reduction, reduction in probability of restrike and ability to reenergize in a relatively fast time.

Electric utilities are facing an increasing dependence on the control of reactive compensation for normal and contingency operation. In many applications these reactive components are switched on a daily basis to match the cyclic demand of power. As used herein, the terminology "reactive components" is meant to comprise capacitors, inductors, transformers and power lines.

Capacitor switching by traditional methods is resulting in a greater exposure to overvoltages as the number of reactive power sources increase. This is becoming a growing concern for power quality, equipment overvoltages and transient system stability. Switching of shunt capacitor banks primarily affects power quality. Overvoltages are caused by high inrush currents when closing or possible re-strikes immediately after opening. Methods to reduce overvoltages are continually being explored, such as controlled switching of breakers.

Transient stability would be enhanced by having the ability to switch a capacitor in or out without having to wait five minutes for the capacitor to discharge. Present methods of capacitor switching may be considered slow (traditional mechanically switched capacitor banks) or immediate (thyristor-based switched VAR capacitors). Shunt capacitor banks switched with traditional methods may have a cost range of $10–15/kVar but require at least a five-minute discharge time delay before re-energizing. Thyristor based switching would increase the cost to $30–40/kVar. This may be the only solution for applying reactive compensation if high transient voltages arise from line trip-out or a rapidly developing out-of-step condition. However for most transmission system applications, immediate or nearly instantaneous switching will not be required. For instance, the damping of slow dynamic voltage swings, or prevention of voltage collapse, requires a relatively fast response from between one-half to several seconds for controlling reactive compensation. A combination of traditional capacitor switching methods with DVS in a suitable configuration provides these response times so as to become an intermediate cost alternative.

SUMMARY OF INVENTION

MOVs, while being very good non-linear resistors for voltage surge limiting applications, suffer from the disadvantage that the suppression voltage level is about 1.7 times the normal operating voltage peak. Power electronics, especially thyristors, have proven to be useful in modifying their characteristics to make them more effective in accordance with this invention.

The DVS unit comprises an MOV with an anti-parallel thyristor pair across it as an integrated wafer or in separate blocks. When appropriately commanded, the thyristor pairs are fired to short out the MOV, as shown in FIG. 1. During steady-state operation, the thyristors are kept off, but are suitably triggered during periods when they need to modify the MOV arrester characteristics.

A single DVS unit may be applied for a short time (1 cycle) to suppress inrush overvoltages when energizing capacitor banks. When de-energizing, several DVS units are used to remove the trapped charge on the capacitor to allow relatively fast reclosing.

BRIEF DESCRIPTION OF THE DRAWINGS

FIGS. 4a and 4b graphically illustrate energy dissipation in a 6kV arrester with 1200 Kvar and 2400 Kvar capacitors;

FIG. 6 is a circuit diagram of DVS units applied to a capacitor system;

FIGS. 7a and 7b are graphic representations of voltage simulation results of capacitor deenergization without and with DVS unit operation, respectively;

FIG. 7c is a graphic representation of a simulated capacitor discharge current as a result of capacitor deenergization;

FIG. 8 is a circuit diagram illustrating DVS operation with a capacitor bank upon a breaker restrike.

DESCRIPTION OF PREFERRED EMBODIMENTS

The application of power electronics to MOVs allows many possibilities to utilize them in different configurations resulting in better performance of power system equipment and their protection. Such DVS units can be used during capacitor energization operations to limit the resulting overvoltages and transient system currents. Their application during capacitor de-energizing operations can lead to lowering incidence of breaker restrikes and faster discharge of capacitors. A thyristor (which is utilized as part of the DVS unit) has a typical surge-current carrying capability of about 20 times its rms current rating. Utilization of this rating allows the use of moderate-sized thyristors in the DVS units.

Alternate Transients Program/Electro-Magnetic Transient Program ATP/EMTP simulations supplemented with MOV voltage-current characteristics conforming to industry standards were used to predict the electrical stresses. The voltage waveforms were developed using maximum MOV voltage data. Minimum MOV voltage data was used to obtain MOV currents for energy dissipation waveforms.

Figure 1:
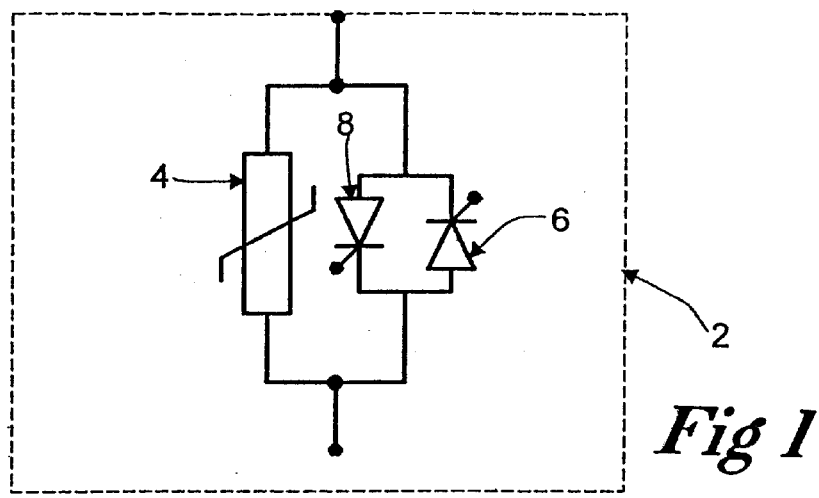
FIG. 1 is a diagrammatic showing of the Dynamic Voltage Suppressor (DVS) of the invention.

FIG. 1, the DVS unit is generally indicated by reference numeral 2. It preferably comprises a MOV arrester 4 wired as shown with an anti-parallel thyristor pair 6,8 connected across it in parallel as shown. This arrangement of the MOV arrester and thyristor pairs may preferably be configured as an integrated wafer assembly to provide the DVS unit 2.

A. Energizing Overvoltage Reduction

Figure 2:
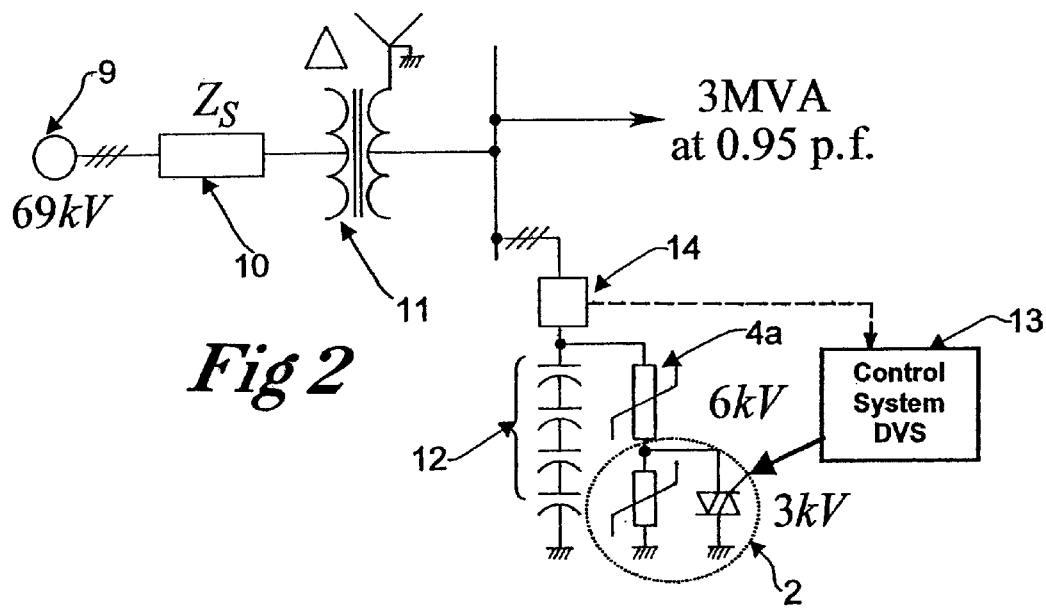
FIG. 2 is a diagrammatic showing of a capacitor energization circuit with the DVS unit.

To illustrate the application of the DVS unit in capacitor energizing operations, an ATP/EMTP simulation is carried out on the system shown in FIG. 2. The diagram is a simple representation of a 69–13.2 kV, 5MVA distribution substation having a 69 kV power source 9 and a Zs source impedance 10 connected to a transformer 11. The system model reduces to a 3-phase, 13.2 kV rms voltage source supplying a grounded-wye 3MVA load at 95% power factor. DVS is demonstrated for capacitor energization during a system contingency of 30% of normal source conditions and 94.4% voltage at the substation. The circuit includes a breaker 14 connected in the 3-phase supply to capacitor bank 12.

The Mean Continuous Operating Voltage (MCOV) involved indicates a 9 kV arrester rating should be used for proper insulation coordination. Also shown is a DVS unit configuration applied across the capacitor 12 in combination with 6 kV and 3 kV MOVs 4a and 4 respectively. The 3 kV arrester 4 is bypassed at the time of energization for a short duration (about 12 ms). This leaves the 6 kV arrester 4a across the capacitor to limit overvoltages. When the DVS unit is turned off, a regular 9 kV arrester appears across the capacitor for normal steady-state operation.

TABLE 1

Peak Voltages in Percent

| Capacitor | | | | | |
|---|---|---|---|---|---|
| kVar | Off | On | No Arrester | 9 kV Arrester | With DVS |
| 1200 | 94.4% | 95.7% | 176.8% | 154.3% | 108.6% |
| 2400 | 94.4% | 97.1% | 170.5% | 154.9% | 110.8% |

Figure 3A:
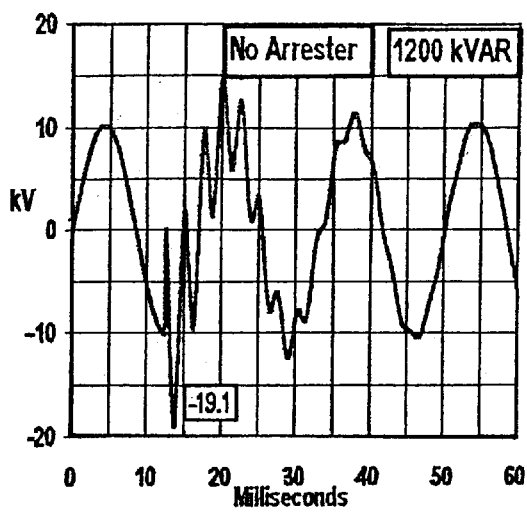
FIGS. 3a, 3b, and 3c are graphic representations of capacitor energization results (a) without an arrester, (b) with a 9 kV arrester and (c) with the DVS unit, respectively.
Figure 3B:
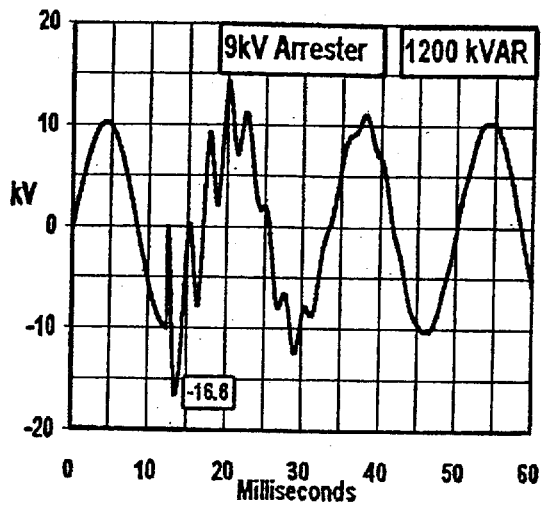
Figure 3C:
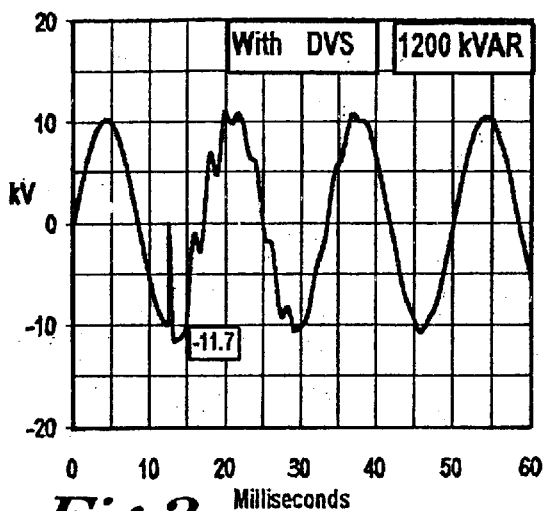

Table 1 lists the peak voltages in percent of nominal peak to ground voltage for switching either a 1200 or 2400 kVar capacitor bank. Nominal voltages are 13.2 kV (1—1 rms), 7.62 kV (l-n rms) and 10.78 kV (p-n). Voltage waveforms are illustrated in FIG. 3 for energizing the 1200 kVar capacitor with (a) no arrester, (b) 9 kV arrester and (c) DVS. DVS power quality enhancement is demonstrated by the overvoltage reduction of about 45 percentage points with an arrester or between 60 to 70 percentage points without an arrester. The effects of doubling the capacitor size indicate the same type of improvements. The change in steady state voltage is as expected—a 1.3 percentage point increase for 1200 kVar capacitor and 2.7 percentage point increase for the 2400 kVar capacitor. It is also interesting to note the transient harmonics ($7^{th}$ for the 1200 kVar and $5^{th}$ for the 2400 kVar capacitor) which will vary depending on system conditions.

Figure 4A:
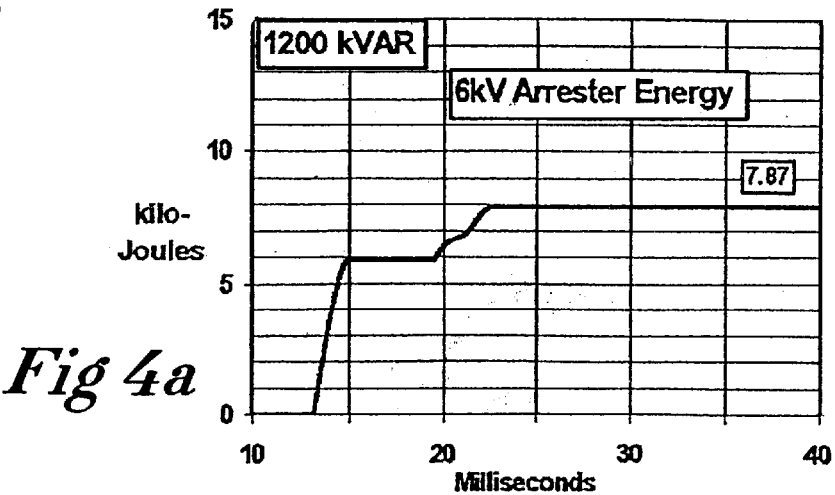

Energy dissipation into the 6 kV MOV is shown in FIGS. 4a (1200 kVar) and 4b (2400 kVar). The 7.9 and 14.8 kilo-joules are well within the 33 kJ (at 5.5 kJ/kV) MOV specifications. The peak surge current through the DVS thyristor is 450A, leading to a possible use of a thyristor with a current rating of 25A for the energization operation.

The control system 13 of FIG. 2 is designed to trigger the DVS anti-parallel thyristor pair(s) 6, 8 into the conductive or deblock mode coincident with the capacitor energize command, as by closing breaker 14. To reduce possibility of voltage magnification (a magnified oscillatory overvoltage created by switching capacitors or reactors or at other locations) the control system 13 will deblock when an overvoltage coincident with specified rate of change (dv/dt) is sensed. Coincident with the capacitor energize command the control system 13 receives a close command or contact closure from the breaker 14 operating system and then deblocks or triggers the thyristor within the DVS 2 to the conductive mode. After approximately one or two cycles of electrical time (16 to 32 ms) the control system then blocks or triggers the DVS thyristors to the non-conduct mode.

Figure 5:
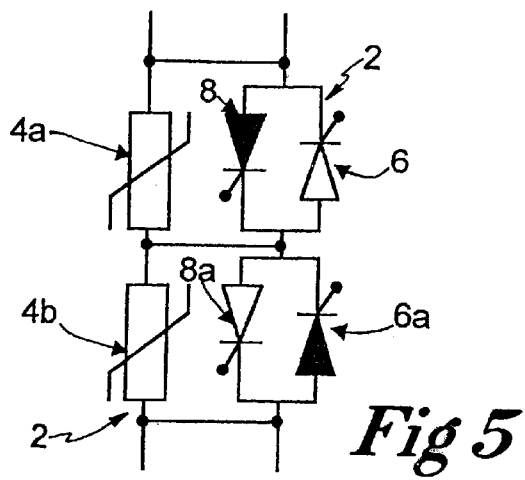
FIG. 5 is a diagrammatic showing of alternate triggering of multiple DVS units.

Multiple, equally rated DVS wafers/blocks 2 may also be used with the system of FIG. 2. In such an embodiment, the control system will alternately trigger different thyristors on separate half-cycles as illustrated in FIG. 5. If the thyristors 6a and 8 are kept triggered, then arrester 4a is shorted. Arrester 4b is shorted when thyristors 6 and 8a are triggered. A continuation of the control circuit operation is used to trigger the DVS unit to a non-conductive or block mode after the capacitor has been energized for somewhat longer than one cycle of electrical time.

B. Transmission Substation Capacitor Switching

A circuit diagram of a power system network with a capacitor bank 12 is shown in FIG. 6. It consists of an effectively grounded 345 kV source feeding three circuits at 115 kV. An autotransformer 11 with separate tertiary winding converts the 345 kV voltages to 115 kV. The 345 kV source supplies 220MW to the three circuits, and a resistive 2MW load bus. A grounded-Wye connected capacitor bank 12 rated for 80MVAR is attached to the bus through surge-limiting inductors 15. The MCOV involved leads to a 90 kV rated MOV across the capacitor. The DVS configuration of four units 2 involves the use of a segmented MOV (45 kV, 8 kV, 8 kV, 29 kV) of several ratings and a 50Ω resistance as shown in FIG. 6. It is anticipated that any number of DVS units may be utilized depending upon the application. After breaker 14 open command is initiated and the capacitor system measures a zero current from the current transformer 16, the capacitor is de-energized in the following steps; (1) deblock 45 kV DVS after 1 ms; (2) deblock first 8 kV DVS after 2 ms; (3) deblock second 8 kV DVS after 3 ms; and (4) deblock 50 ohm resistor after 4 ms.

FIGS. 7a–7d illustrate graphically simulated results of a breaker opening in a capacitor switching out or deenergization operation in a power system as shown in FIG. 6.

Capacitor and breaker voltage waveforms for a breaker opening at 14 are shown in FIG. 7a. The capacitor 12 retains a trapped charge equivalent to peak bus voltage. This causes the breaker 14 to be exposed to twice peak bus voltage (190.3 kV).

Implementation of DVS limits the voltage stress to a level similar to that of resistive switching as illustrated in FIG. 7b. This is accomplished by measuring zero current for some time (about 1 ms) starting with the breaker open action, to confirm the capacitor 12 has been disconnected from the system. Then the DVS units 2 as shown in FIG. 6 are triggered in sequence to progressivly discharge the capacitor. The discharge is timed to coincide with the bus voltage waveform. During the first quarter cycle the contact voltage at breaker 14 is relatively small. Afterwards, the peak voltage across the breaker contacts is limited to the bus voltage level. The process should eliminate the incidence of breaker restrikes.

Figure 7D:
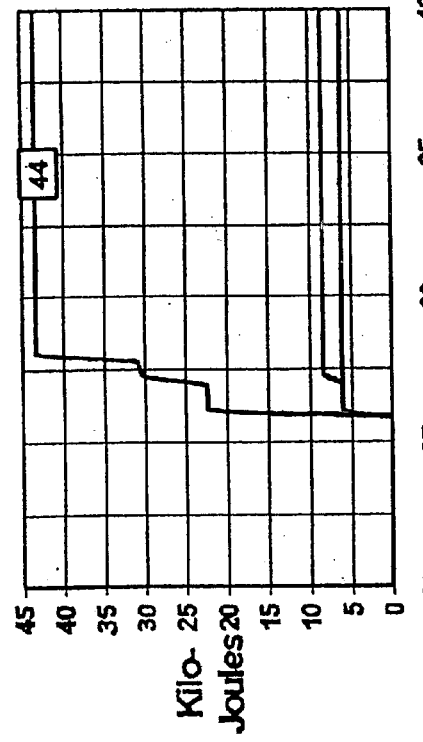
FIG. 7d is a graphic representation of simulated energy dissipation in the MOV arresters as a result of capacitor deenergization.

Capacitor discharge current is shown in FIG. 7c. The second part of the waveform is also the currents through various thyristor switches in the DVS unit. During the final stage of discharge, the 50 ohm resistor of FIG. 6 is used to discharge the capacitor fully. The currents through the DVS units 2 are in the comfortable range of 1 kA allowing a 50A thyristor to be, theoretically, sufficient for the purpose. FIG. 7d shows energy dissipation in the MOV arresters. The peak dissipation of 44 kJ corresponds to the 29 kV arrester, and is well within its maximum dissipation rating of 160 kJ.

One concern during the above discharge operation is regarding what will happen if a capacitor restrike occurs when the operation is in progress. The highest probability is during the last stage when the capacitor is discharging through the resistor during the long-tail period, and the DVS unit thyristors would be conducting.

However, it is noted that during the entire process, although typically both the anti-parallel thyristors of a DVS unit are triggered, a single thyristor would be conducting at a given time, depending on the polarity of the capacitor voltage. During the long tail period, it is noted that the bus voltage has reversed its polarity. Thus a breaker restrike would cause the voltages across the thyristors to reverse its polarity, automatically switching off the conducting thyristors, in a self-protecting manner. The capactior 12 discharges thorugh the conducting thyristors in the path shown by the arrows. This is illustrated in FIG. 8.

EMTP simulation results of capacitor energization in the power system of FIG. 6 are shown in FIG. 9. Here the lower 29 kV and 8 kV rated arresters are shorted as part of the DVS operation. The 50 ohm resistor is retained in the circuit to limit the current through MOV and DVS units.

Figure 9A:
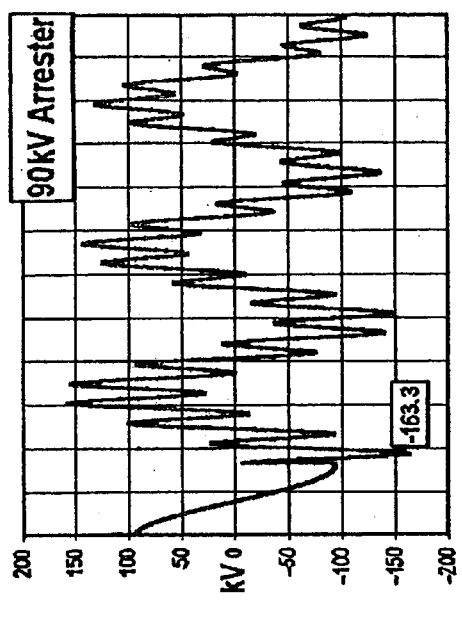
FIGS. 9a and 9b are graphic representations of simulated capacitor voltage results of capacitor bank energization without and with DVS operation, respectively.

FIG. 9a shows the bus voltage transients with a 90 kV MOV across the capacitor. FIG. 9b shows the improved characteristics resulting from the use of the DVS units corresponding to shorting the 29 kV and 8 kV MOVs during energization. Further improvement is accomplished by inserting a 6 kV MOV accross the 50 ohm resistor as illustrated in FIG. 6a, with the results illustrated in FIG. 9c.

Figure 9C:
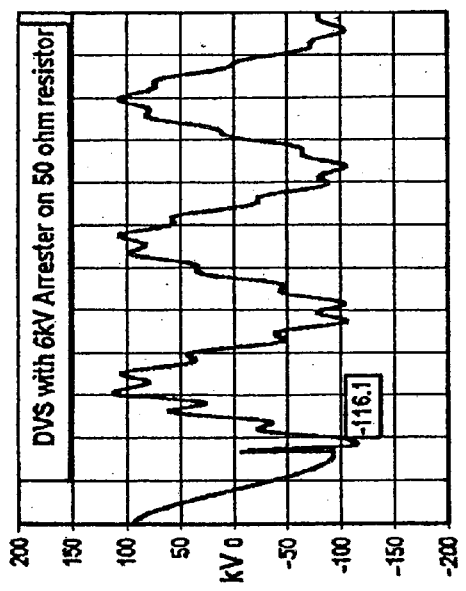
FIG. 9c is a graphic representation of simulated capacitor voltage results of capacitor bank energization with DVS units and a 6 kV arrester across a 50 ohm resistor.
Figure 9B:
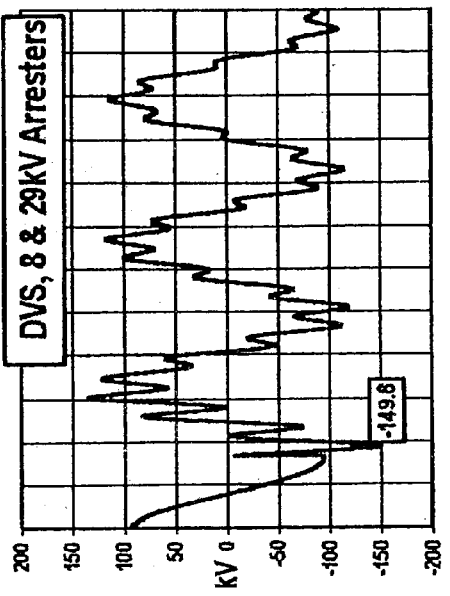

Although the FIG. 9c voltage waveforms are definitely an improvement, the MOV energy dissipation is beyond the maximum specified rating of 5.5 kJ per kV for the 8 kV MOV. Table 2 column FIG. 9c1 shows the energy dissipation increase.

TABLE 2

MOV Energy Dissipation for FIG. 9

| DVS MOV Rating | FIG. 9 b | FIG. 9 c1 | FIG. 9 c2 | Arrester Rating at 5.5 kJ/kV |
|---|---|---|---|---|
| 45 kV | 120 kJ | 170 kJ | 170 kJ | 245 kJ |
| 8 kV (1st) | 26 kJ | 45 kJ | 33 kJ | 44 kJ |
| 8 kV (2nd) | — | — | 12 kJ | 44 kJ |
| 6 kV across R | — | 27 kJ | 27 kJ | 33 kJ |

In the above simulations, instead of shorting a single 8 kV arrester all through the closing operation (which lasts for about 1 cycle), each of the two 8 kV arresters of FIG. 6 are shorted in different half-cycles of the bus voltage. By doing so, the energy dissipation is divided among the two arresters, helping each to remain within their energy dissipation limits which is shown in Table 2 column FIG. 9c2. A convenient method of achieving this is to fire opposing thyristors in parallel with the two 8 kV arresters, as shown in FIG. 5.

The use of the Dynamic Voltage Suppressor (DVS) when switching capacitors offers several significant performance improvements. These advantages may be obtained from the distribution voltage level through EHV. The application of a single DVS unit with a two element stacked MOV will suppress and rapidly damp out inrush overvoltages. The overvoltages may be held to less then 1.1 p.u. which is a major improvement from the probable peak levels of between 1.5 to 1.8 p.u. without DVS. When de-energizing, re-strike prevention is accomplished by applying a multi-element MOV with DVS units to remove the trap charge in steps matching the voltage waveform as illustrated in FIG. 6. This process allows re-energizing within a few cycles of electrical frequency.

In addition to the reduced exposure to overvoltages and possible improvements in transient stability, conventional vacuum switches or circuit switchers may be considered. For a capacitor switching failure scheme, replacement of existing breakers should not be required since the breakers are not exposed to traditional inrush overvoltages or double voltage due to trapped charges. Existing capacitor banks may be easily upgraded to obtain these benefits and also be used to improve system transient stability by having the ability to re-energize in a very short time after de-energizing. New capacitor banks may be installed in the conventional manner and upgraded in the future to obtain the transient stability feature.

What is claimed is:

1. In a high voltage power transmission and distribution reactive component discharge circuit, electrical apparatus to suppress a trapped charge and thereby reduce the probability of switching and allow relatively fast re-energizing comprised of:

a reactive component comprising a capacitor connected in a power circuit in parallel with a plurality of sets of metal oxide varistors (MOVs) and anti-parallel thyristor pairs connected in parallel, each such set comprising a dynamic voltage suppressor (DVS) unit, said DVS units being connected in series; and a controller connected in the circuit to trigger the DVS anti-parallel thyristor pairs sequentially into a conductive mode at regular intervals coincident with a reactive component de-energize command and detection of zero current flow for one millisecond which will discharge capacitor, matching the voltage waveform; and a resistor connected in series with the MOVs of the DVS units to limit the current through the MOV and DVS units.

2. The circuit combination of claim 1 and further including:

an MOV connected in parallel with the resistor.

* * * * *